United States Patent [19]
Fifer

[11] 4,085,638
[45] Apr. 25, 1978

[54] APPARATUS FOR CUTTING LUMBER TO VARIABLE CLEAR LENGTHS

[76] Inventor: James T. Fifer, 791 N. Shore Rd., Lake Oswego, Oreg. 97034

[21] Appl. No.: 740,532

[22] Filed: Nov. 10, 1976

[51] Int. Cl.² .............................................. B27B 5/00
[52] U.S. Cl. ......................................... 83/71; 83/150; 83/155; 83/208; 83/371; 83/365; 83/368; 83/516
[58] Field of Search .................... 83/516, 517, 71, 365, 83/368, 371, 208, 155, 150, 364, 369

[56] References Cited

U.S. PATENT DOCUMENTS

| | | | |
|---|---|---|---|
| 3,191,857 | 6/1965 | Galey et al. | 83/71 X |
| 3,322,961 | 5/1967 | Harrison et al. | 83/364 X |
| 3,329,181 | 7/1967 | Buss et al. | 83/364 X |
| 3,415,149 | 12/1968 | Ziljberman et al. | 83/364 X |
| 3,556,368 | 1/1971 | René | 83/208 X |
| 3,811,353 | 5/1974 | Miles | 83/71 |
| 3,871,258 | 3/1975 | Hurn | 83/371 X |
| 3,885,483 | 5/1975 | Ikeya et al. | 83/368 X |

*Primary Examiner*—J. M. Meister
*Attorney, Agent, or Firm*—Eugene D. Farley

[57] ABSTRACT

Apparatus for cutting lumber to random or specified clear lengths by removal of sections containing defects and by making single end or intermediate cuts, includes infeed means for transporting a piece of lumber, locating means for locating the piece of lumber longitudinally in the apparatus, a fixed saw for cutting the piece of lumber at a first position, and a sliding saw selectively positionable longitudinally with respect to the fixed saw for cutting the piece of lumber at a second position which is located a spaced distance from the first position co-extensive with the extent of the defect. The fixed saw also is configured for operation independently of the sliding saw for making the single cuts.

Saw positioning means positions the sliding saw longitudinally, based on commands from a computer for removal of the defect with the minimum removal of clear lumber. Outfeed means which transports the clear piece of lumber out of the apparatus is tied to the sliding saw in a manner for translation therewith and is configured for transporting the piece of lumber at the same linear speed as the infeed means at all times including during the translation of the sliding saw.

8 Claims, 18 Drawing Figures

APPARATUS FOR CUTTING LUMBER TO VARIABLE CLEAR LENGTHS

BACKGROUND OF THE INVENTION

This invention relates to an apparatus for cutting lumber to random or specified clear lengths and in particular to such an apparatus having at least one movable sliding saw for removing sections containing defects from the lumber with the minimum amount of waste.

When clear lumber having no defects or flaws is desired, larger pieces of lumber must be cut transversely to remove the sections containing the defects. Cutting apparatus having two saws for removal of the defects simultaneously are known in the prior art. For example, such an apparatus is shown in U.S. Pat. No. 3,811,353.

However, the prior art lumber cutting apparatus have saws which are spaced apart a fixed distance calculated to be coextensive with most defects. If the saw spacing is set to accommodate the largest defect length, which it must be if the apparatus is not always to be shut down for respacing of the saws, when a defect covering a shorter length is removed necessarily a portion of clear lumber is removed also. Thus a portion of clear lumber is lost with most, if not all, of the cuts. This is wasteful and raises the cost of the clear lumber product.

It is the general purpose of the present invention to provide an apparatus for cutting lumber to random or specified clear lengths having at least one fixed saw and at least one longitudinally movable sliding saw for removing defects from the piece of lumber with the minimum removal of clear lumber or for cutting it to a specified length.

It is a further object of the present invention to provide an apparatus for cutting lumber to random or specified clear lengths having infeed and outfeed means adapted for transporting the piece of lumber and for clamping it during sawing at points adjacent the respective cuts.

It is a further object of the present invention to provide an apparatus for cutting lumber to random or specified clear lengths having outfeed means translatable with the sliding saw in order to provide support for the lumber and clamp it during sawing immediately adjacent to the sliding saw, and which is configured to transport the piece of lumber at the same linear speed as the infeed means at all times allowing the sliding saw to be moved simultaneously with translation of the piece of lumber.

It is a further object of the present invention to provide an apparatus for cutting lumber to random or specified clear lengths wherein the lumber is transported in a positive manner for precision indexing longitudinally in the apparatus giving accurate location of the cuts.

It is a further object of the present invention to provide an apparatus for cutting lumber to random or specified clear lengths wherein only one of a pair of saws need be actuated for end cutting the lumber or making intermediate cuts to a specified length when no defect is to be removed.

It is a further object of the present invention to provide an apparatus for cutting lumber to random or specified clear lengths wherein the defects and end trims are removed from the apparatus immediately upon cutting.

THE DRAWINGS

The manner in which the foregoing and other objects of the invention are accomplished will be apparent from the accompanying specification and claims, considered together with the drawings, wherein:

GENERAL STATEMENT OF THE INVENTION

The lumber cutting apparatus of my invention broadly comprises infeed means configured for supporting and transporting a piece of lumber longitudinally in the apparatus and clamping it during sawing, a fixed saw mounted at the downstream end of the infeed means for cutting the piece of lumber transversely at a first position, and a sliding saw located adjacent to the fixed saw and movable longitudinally for cutting the piece of lumber in a second position, spaced from the first position by a specified distance, for removal of a defect located therebetween. Saw positioning means is attached to the sliding saw in a manner for translating it relative to the fixed saw in specified intervals and for positioning the sliding saw accurately in order to remove the minimum amount of clear lumber along with the defect.

Outfeed means configured for transporting the piece of lumber out of the apparatus after removal of the defect is tied to the sliding saw for translation therewith. Thus the outfeed means is positioned adjacent to the saw blade at all times for supporting the piece of lumber and clamping it during the cutting. The outfeed means is arranged in a manner allowing it to move with the sliding saw while simultaneously transporting the piece of lumber at the same linear rate as the infeed means. As a result, the sliding saw is movable while the lumber is being transported, reducing the time interval between cuts.

A computer associated with the apparatus receives input from an operator or from an automatic scanning system with respect to where a single cut should be made or with respect to the length of the defect and its distance from the leading edge of the piece of lumber or from the last cut. This input is combined with information from a locating means which is located on the infeed means indicating the longitudinal location of the piece of lumber to position the sliding saw automatically at the proper spacing. The locating means generally comprises a counter wheel which measures the linear travel of the piece of lumber in the apparatus. In addition the computer causes the infeed and outfeed means to stop transportation of the piece of lumber while the cut or cuts are being made.

DETAILED DESCRIPTION OF A PREFERRED EMBODIMENT

Figure 1A:
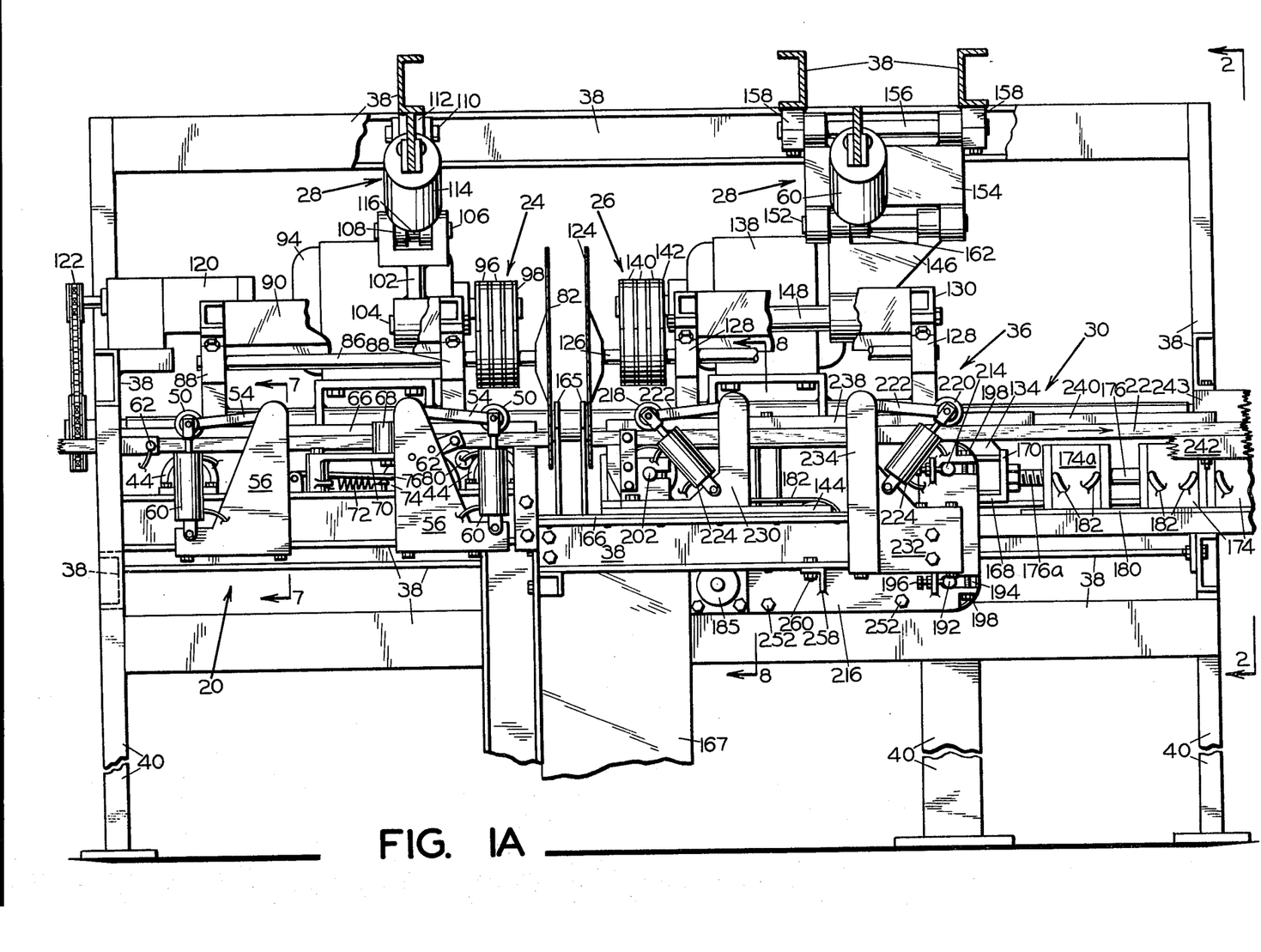
FIGS. 1A and 1B are views in side elevation of the herein described apparatus, foreshortened and partially broken away, better to show concealed construction.
Figure 3:
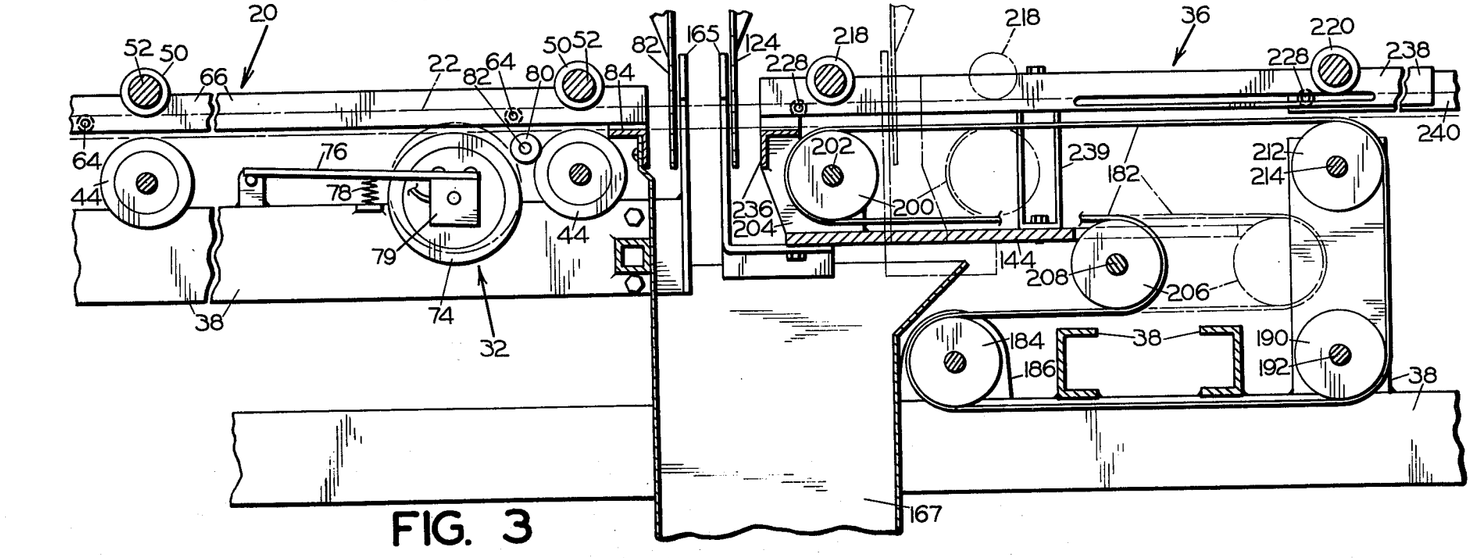
FIG. 3 is a foreshortened, fragmentary sectional view, taken on the line 3—3 of FIG. 2.
Figures 5A, 7:
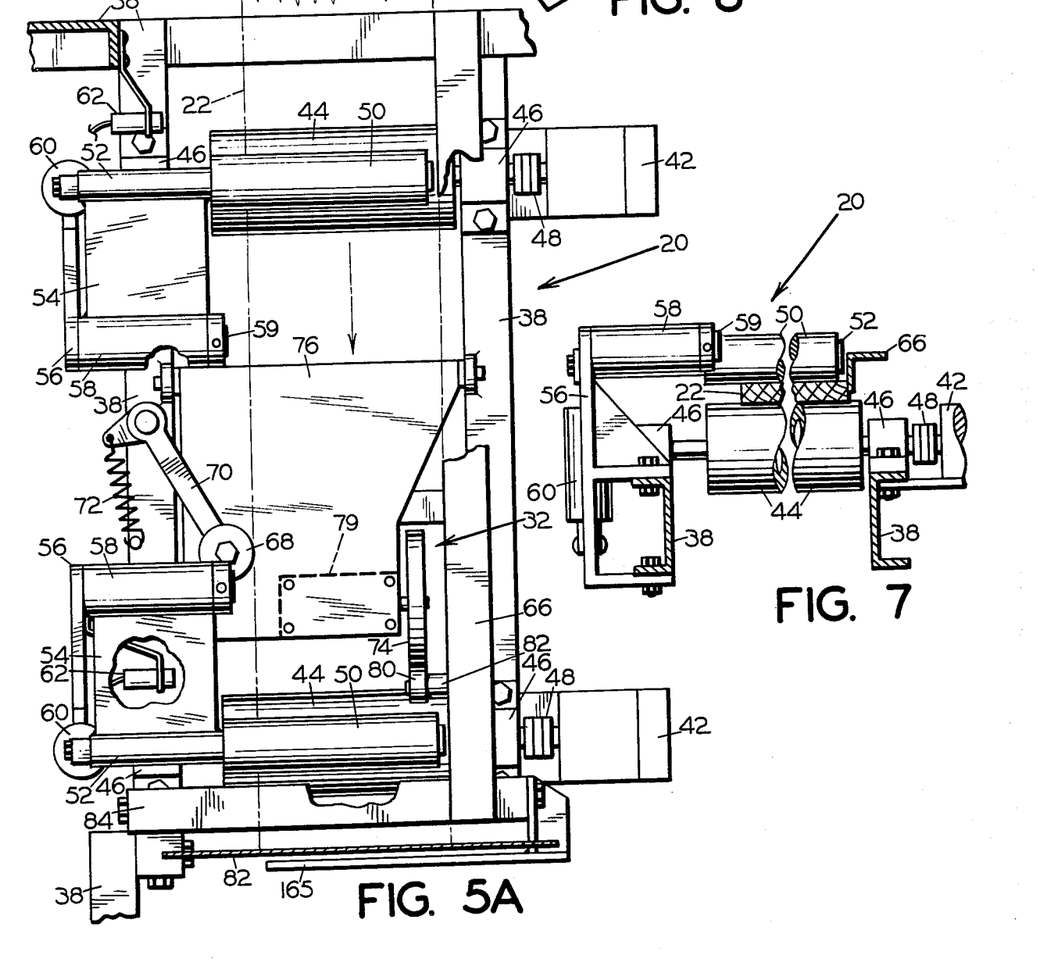
FIGS. 5A and 5B are fragmentary sectional views, in plan, taken on the lines 5A—5A and 5B—5B respectively of FIG. 2, partially broken away to show concealed structure.
FIG. 7 is a fragmentary, foreshortened sectional view taken on the line 7—7 of FIG. 1A.

As shown particularly in FIGS. 1A, 3 and 5A, the lumber cutting apparatus of the present invention generally comprises infeed means 20 for transporting a piece of lumber 22, a longitudinally fixed saw assembly 24 for cutting the piece of lumber transversely at a first position, a sliding saw assembly 26 longitudinally movable with respect to the fixed saw assembly for cutting the piece of lumber at a second position spaced apart from the first position, saw actuation means 28 connected to each saw and configured for moving both saws independently to their cutting positions, and saw positioning means 30 joined to the sliding saw assembly and configured for moving it relative to the fixed saw assembly for separating the cuts at the first and second positions by a specified distance.

Locating means 32 (FIG. 1B) determines the position of the sliding saw longitudinally in the apparatus in relation to the fixed saw for cutting the piece of lumber by the sliding saw at the proper location. A computer 34 receives input from an operator, FIG. 15, or a scanner, FIG. 16, and from the locating means to control accordingly the infeed means, the saw positioning means and the saw actuation means for making a cut or removing the defect with minimum removal of clear wood. Outfeed means 36 transports the cut piece of lumber out of the apparatus. The aforementioned elements of the apparatus are mounted on a frame 38 formed from interconnected elongate beams and positioned above the floor by means of legs 40.

The Infeed Means

As stated above the infeed means 20 transports a piece of lumber into the apparatus. Referring to FIGS. 1A, 3, 5A and 7 the infeed means includes hydraulic drive motors 42 located on the frame and rotatably driving rubber covered lower rollers 44. The lower rollers extend transversely of the frame and are journaled in bearings 46. Universal couplings 48 interconnect the motors and the lower rollers. In the embodiment illustrated two lower rollers and motors are shown with the motors connected to each other in series in order that they will operate at the same speed.

Mounted upwardly adjacent to each of the lower rollers is a smaller diameter hold-down roller 50, FIGS. 5A and 7. Each hold-down roller is journaled freely on a shaft 52 which is connected to a roller arm 54. A roller support frame 56, fixed to frame 38, is joined to the roller arm by means of an integral sleeve 58 rotatably mounted on a shaft 59. A fluid operated piston-cylinder 60 is connected between the end of the shaft 52 and the roller support frame for moving the hold-down roller angularly between a lowered position, against the top of a piece of lumber being transported on top of the lower rollers, and a raised position free of the piece of lumber.

A photocell 62 and associated light source 64 are attached to the frame opposite each other adjacent to each of the hold-down rollers. Each photocell is connected to its associated cylinder 60 in such a manner that when the light beam is interrupted the photocell activates the cylinder and thus moves the hold-down roller to its lowered position. In the embodiment illustrated a time delay circuit (not shown) associated with each photocell delays the actuation of the cylinder until the leading edge of the board has passed between the lower roller and the hold-down roller.

An infeed fence 66, FIGS. 3, 5A, formed from an angle beam is attached longitudinally to the frame adjacent to the lower rollers for engaging the longitudinal edge of the piece of lumber 22 and guiding it through the apparatus. A side roller 68 for urging the piece of lumber against the fence is carried rotatably on an arm 70 which is joined pivotally to the frame. A spring 72 interconnecting the arm 70 and the frame 38 urges the side roller inwardly against the edge of the piece of lumber.

The Locating Means

The locating means 32 determines the position of the piece of lumber longitudinally in the apparatus as it is transported by the infeed means. To this end a thin counter wheel 74, FIGS. 3 and 5A, is mounted rotatably on a wheel plate 76 in a position near the downstream lower roller 44. The wheel plate is connected pivotally to the frame in a manner allowing the counter wheel to be positioned against the lower surface of the piece of lumber which is being transported on the rollers.

A spring 78, mounted on the frame, engages the wheel plate urging the counter wheel upwardly against the piece of lumber. A counter 79 is attached to the counter wheel 74 to respond to the angular movement of the wheel.

Located adjacent to the downstream lower roller and driven thereby is an intermediate roller 80 which is journaled rotatably on stub shaft 82 joined to the frame. The intermediate roller is positioned for engaging the counter wheel 74 when the counter wheel is not being deflected by a piece of lumber.

The Fixed Saw

Figures 1B, 6, 13:
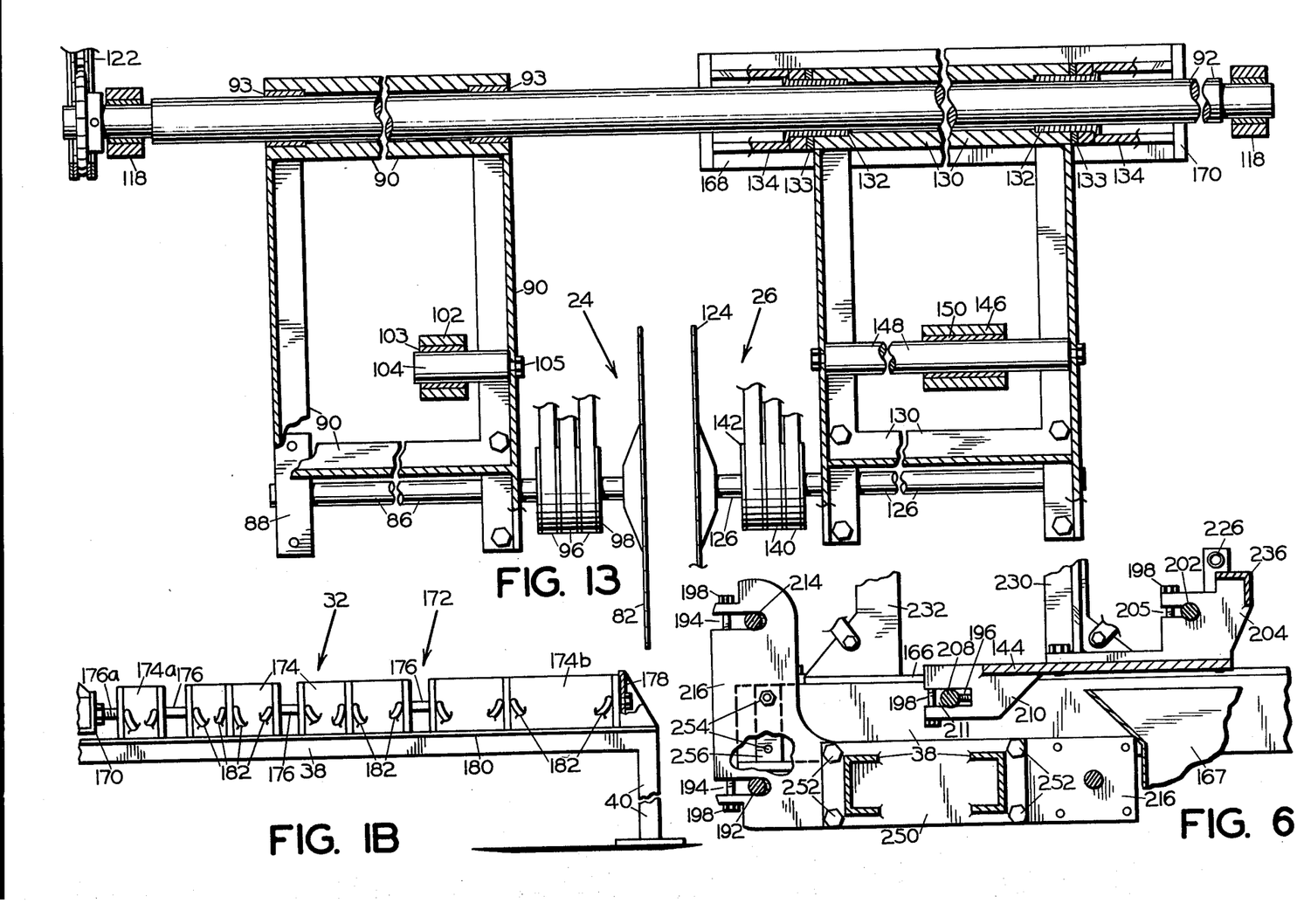
FIG. 6 is a fragmentary sectional view taken on the line 6—6 of FIG. 2.
FIG. 13 is a fragmentary, foreshortened sectional view taken on the line 13—13 of FIG. 2, partially broken away to show concealed structure.
Figures 10, 11, 12:
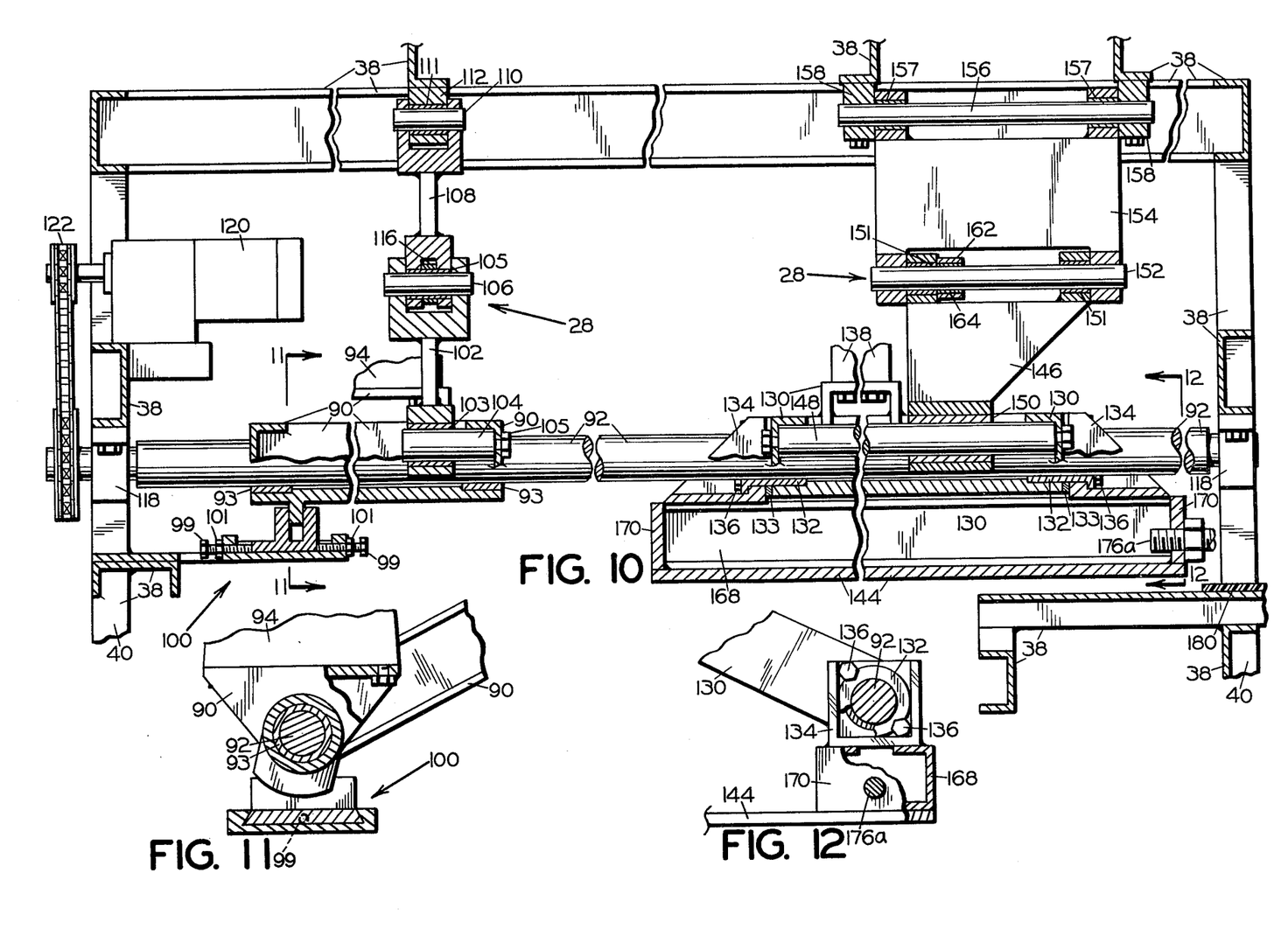
FIG. 10 is a fragmentary, foreshortened sectional view taken on the line 10—10 of FIG. 2.
FIG. 11 is a fragmentary sectional view taken on the line 11—11 of FIG. 10, partially broken away to show concealed structure.
FIG. 12 is a fragmentary sectional view taken on the line 12—12 of FIG. 10, partially broken away to show concealed structure.
Figure 14:
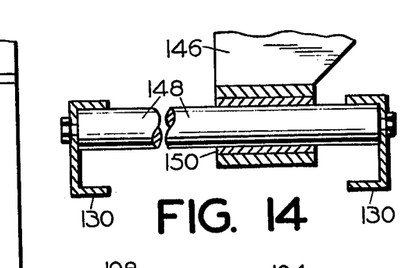
FIG. 14 is a fragmentary, foreshortened sectional view taken on the line 14—14 of FIG. 2.

The fixed saw 24, FIGS. 1A, 10 and 13, is located downstream of the infeed means for cutting the piece of lumber transversely at a first position. The saw blade 82 of the fixed saw is mounted as close to the exit of the infeed means as possible in order that the piece of lumber may be supported against movement during sawing.

An angled bed plate 84 is attached to the frame adjacent to the saw blade 82 to support the piece of lumber during sawing. Referring to FIG. 3 the bed plate is mounted slightly lower than the lower surface of a piece of lumber traveling freely on lower roller 44 of the infeed means. However, when the hold-down roller 50 is placed in its lowered position the piece of lumber is lowered slightly due to the compression of the rubber coating on the lower roller, FIG. 4. Thus the piece of lumber is engaged by the bed plate effectively clamping it during the sawing.

The saw blade is arbor mounted in the conventional manner on a shaft 86 which is journaled in bearings 88. The bearings 88 are attached to a saw frame 90 which is carried pivotally on a rotatable frame mounted longitudinal shaft 92 by means of bushings 93, for movement of the saw blade between a lowered position or range of positions for cutting a piece of lumber and a raised position above the lumber. The saw blade is driven by a saw drive motor 94 which is attached to the saw frame 90 through V-belts 96 and pulleys 98.

Adjustment means 100, FIGS. 10 and 11, interconnects the saw frame 90 and the frame 38 fixing the saw against longitudinal movement on the longitudinal shaft 92. The adjustment means includes set screws 99 and lock nuts 101 for adjusting the position of the saw blade relative to the angle support 84.

The saw actuation means 28 associated with the fixed saw includes a first knuckle arm 102, FIG. 10, pivotally connected at one end through bushing 103 to a stub shaft 104 which is joined removably for replacement to the saw frame 90 by means of bolt 105. The first knuckle arm is joined at its other end to pin 106. Pin 106 is attached pivotally to one end of a second knuckle arm 108 by means of bushings 105. The other end of the second knuckle arm is joined to pin 110.

Pin 110 is attached pivotally to the frame by means of bushing 111 mounted in bearing 112. A double acting fluid operated piston-cylinder 114, FIG. 1A, pivotally joined at one end to frame 38 has an extensible ram 116 which is joined to pin 106 at the intersection of the first and second knuckle arms for actuation of the fixed saw.

The Sliding Saw

As noted the sliding saw 26, FIGS. 1A, 2, 10 and 13, is movable longitudinally with respect to the fixed saw for cutting the piece of lumber at a second position which is spaced apart from the first position. The sliding saw generally translates along the rotatable longitudinal shaft 92 to which the frame 90 of the fixed saw is attached. In order to reduce the sliding friction of the saw, shaft 92 is journaled in bearings 118, positioned at each end of the frame 38, and is rotated by a motor 120 through a chain drive 122.

The sliding saw includes a saw blade 124 arbor mounted, coaxially with the fixed saw blade 82, on saw shaft 126. The saw shaft is journaled in bearings 128 which are mounted on a sliding saw frame 130.

The sliding saw frame is mounted slidably and pivotally on the longitudinal shaft 92, FIGS. 10 and 13. Cylindrical bushings 132 which fit into notches in the sliding saw frame journal it on the shaft. The bushings partially extend into end frames 134 which are positioned outside of the sliding saw frame 130 on shaft 92 and are slidable and pivotal therewith. The bushings are retained in place by bolts 136 which are attached to end frames 134. Thus the sliding saw also is movable between a lowered position for cutting a piece of lumber and a raised position.

The saw blade is driven by a saw drive motor 138 through V-belts 140 and pulleys 142. The saw motor is attached to the saw frame 130 for movement therewith.

Figure 2:
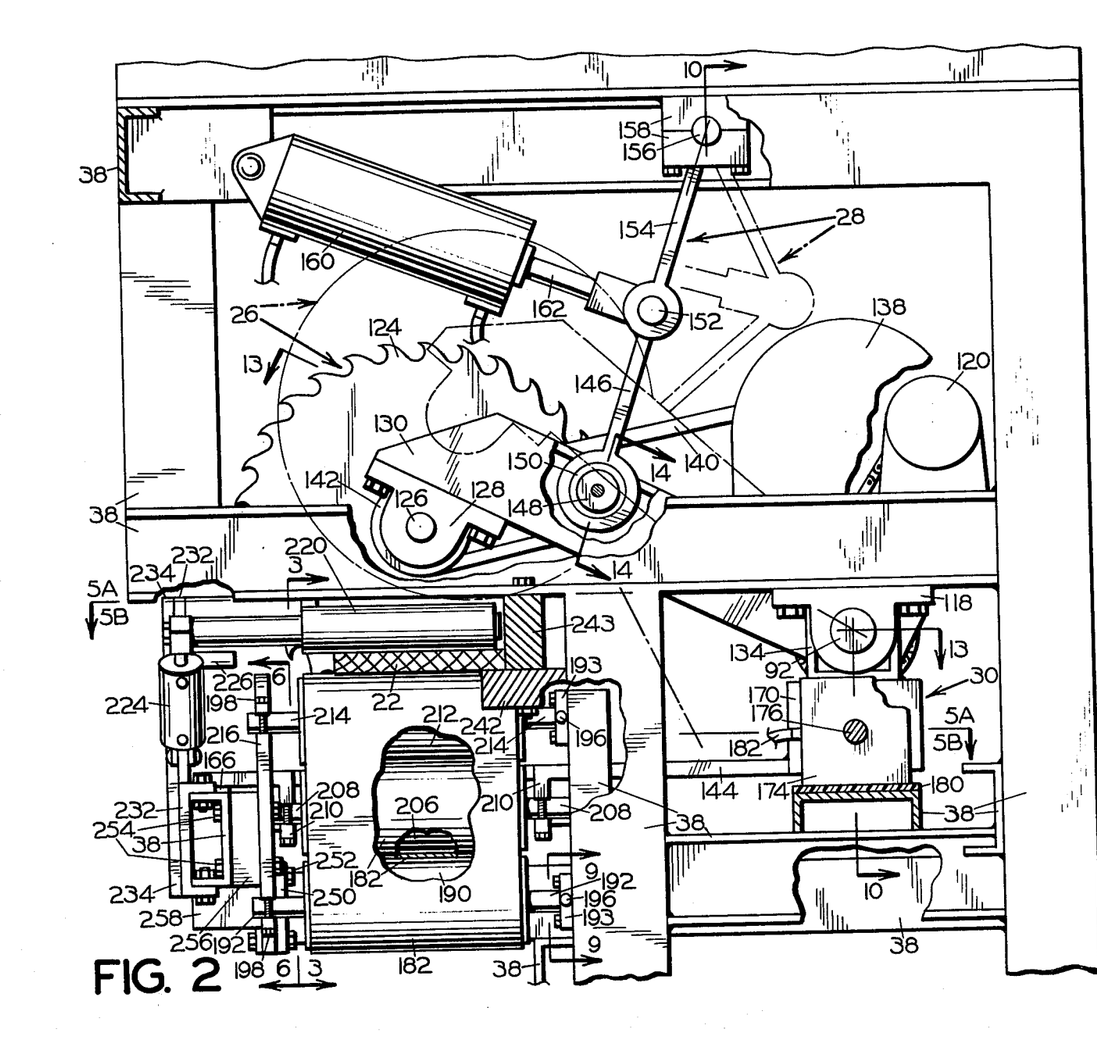
FIG. 2 is a fragmentary sectional view of the apparatus looking in the direction of the arrows of line 2—2 of FIG. 1A, with parts broken away to show concealed construction.

The saw actuating means 28 associated with the sliding saw 26 includes a trapezoidal first hinge plate 146, FIGS. 2, 10, pivotally and slidably connected at its smaller end to shaft 148 through bushings 150. The shaft 148 is joined to the sliding saw frame 130. The first hinge plate 146 is joined pivotally at its other end through bushings 151 to pin 152 which is attached to one end of a rectangular second hinge plate 154. The other end of the second hinge plate is joined pivotally to pin 156 through bushings 157.

Pin 156 is attached to the frame through blocks 158. A double-acting fluid operated piston-cylinder 160 pivotally joined at one end to the frame 38 has an extensible ram 162 which is joined to pin 152 through bushing 164 at the intersection of the first and second hinge plates.

A pair of L-shaped safety lugs 165, FIG. 1A, extend between the two saw blades for restraining the removed defect, preventing it from flying out of the apparatus. They terminate in a chute 167 which empties into a bin (not shown) for collection of the removed defects.

The Saw Positioning Means

The saw positioning means 30, best shown in FIGS. 1A, 1B, 2, 5B and 10, is connected to the sliding saw and move it longitudinally to the desired location. The moving elements of the saw positioning means are mounted on an irregularly shaped sliding plate 144. The sliding plate slides freely on one of its margins on a thin antifriction pad 166 which is attached to the frame.

Rigidly attached to the other edge of the sliding plate 144 is an elongated partial box frame 168 which is integral with end frames 134. The frame thus supports the other margin of the sliding plate 144 through its sliding connection with longitudinal shaft 92 and causes the sliding saw 26 to move along with the sliding plate.

Rectangular end plates 170 enclose the ends of the box frame 168 and tie it to a set works 172 which moves longitudinally along frame 38.

The set works 172, FIG. 1B, comprises a plurality of freely translatable, double-acting fluid operated piston-cylinders 174 joined together end to end. The cylinders have rams 176 of varying lengths in specified intervals. Thus actuation of each cylinder causes extension or contraction of the set works a predetermined amount which is different for each cylinder or combination of cylinders.

The ram 176a of the forwardmost cylinder 174a is tied to the end plate 170 of the box frame 168, and the end of the rearwardmost cylinder 174b is tied to a stop 178 which is attached to frame 38. Thus expansion or compression of the set works respectively causes forward (towards the left in FIG. 1B) or rearward movement of sliding plate 144 and saw blade 124. The cylinders of the set works are supported on an antifriction plate 180 which is joined to the frame 38. Tubing 182 interconnects the cylinders to controls (not shown) in a manner for individual actuation of the cylinders.

The Outfeed Means

The outfeed means 36, FIGS. 1A, 2, 3 and 5B, which transports the piece of lumber out of the apparatus is tied to the saw positioning means 30 and moves along with the sliding saw 26.

The outfeed means comprises an endless belt 182 which is driven at the same linear speed as the infeed means for transporting the piece of lumber at the same rate as the infeed means. Therefore, a compensating roller system is provided for controlling belt speed when the outfeed means moves longitudinally during the setting of the sliding saw position between cuts.

Figure 8:
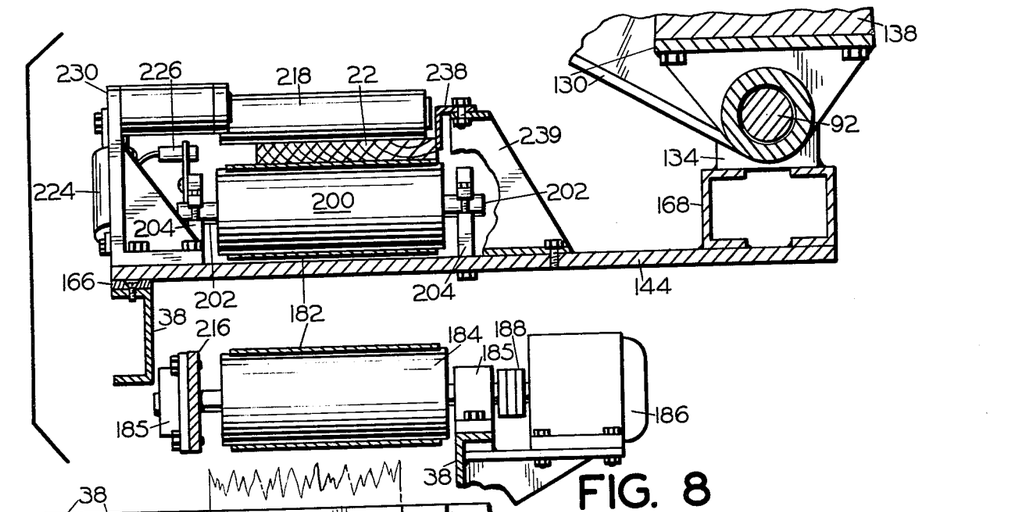
FIG. 8 is a fragmentary sectional view taken on the line 8—8 of FIG. 1A, partially broken away to show concealed structure.
Figure 9:
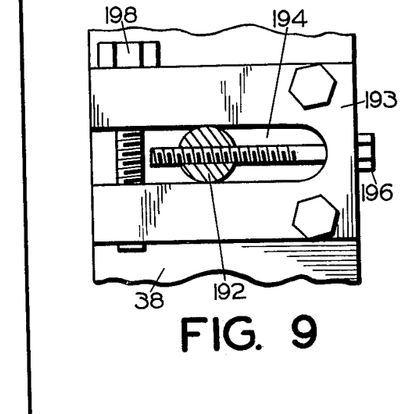
FIG. 9 is a fragmentary sectional view taken on the line 9—9 of FIG. 2.

To this end a fixed powered roller 184, FIG. 8, is journaled in bearings 185 which are fixed to frame 38. A hydraulic roller motor 186 drives the roller through a universal coupling 188. Spaced apart from the powered roller, on the same horizontal plane, is a first fixed idler roller 190.

Roller 190 is journaled freely on a shaft 192 which is attached at one end to a frame mounted block 193 and on its other end to an irregularly shaped plate 216, FIG. 6. Plate 216 is attached at one end to pad 250 by bolts 252. Pad 250 is joined integrally with the frame 38 by welding. The other end of plate 216 is attached to the frame by means of bolts 254 which pass through spacers 256. An angle 258 which is welded to the frame secures the bottom of the plate through bolt 260. The ends of the shaft fit into slots 194 located in the block and plate. Adjusting screws 196 passing through openings in the block and plate are threaded into the ends of the shaft for positioning them in the slots. The shaft is secured by tightening clamping bolts 198 which squeeze the open ends of the slots together. Thus the roller shaft can be adjusted slightly in order to pretension the belt and to align the shaft angularly in the apparatus.

A first sliding roller 200, FIGS. 3 and 8, is located on a horizontal plane above the horizontal plane of the first powered roller 184. It is journaled freely on a shaft 202 which is fixed in holders 204 extending upwardly from joinder to the sliding plate 144. Thus roller 200 translates along with the sliding plate. The ends of shaft 202 are positioned in slots 205 located in the holders. Clamping bolts 198 squeeze the open ends of the slots to secure them.

A second sliding roller 206 is mounted on a horizontal plane located between the planes of the powered roller 184 and the first sliding roller 200. It is located rearwardly (to the right in FIG. 3) of both. It is journaled on shaft 208 which is fixed in downwardly facing extensions 210 of the sliding plate 144. Thus it translates with the sliding plate also, FIG. 6. The ends of shaft 208 are positioned in slots 211 located in the extensions 210. Again adjusting screws 196 engage the ends of the shaft for positioning them and clamping bolts 198 squeeze the open ends of the slots to secure them. It will be noted that the irregular shape of plate 216 permits passage of extensions 210 when the sliding plate 144 is translated.

Located horizontally coplanar with the first sliding roller, and vertically coplanar with the first fixed roller, is a second fixed roller 212. It is journaled freely on shaft 214. The shaft is retained adjustably on one end in a block 193, FIG. 2, like that used for retaining the first fixed roller 190, and on its other end by plate 216, FIG. 6.

Again clamping screws 198 and adjustment screws 196 secure the ends of shaft 214.

Figure 5B:
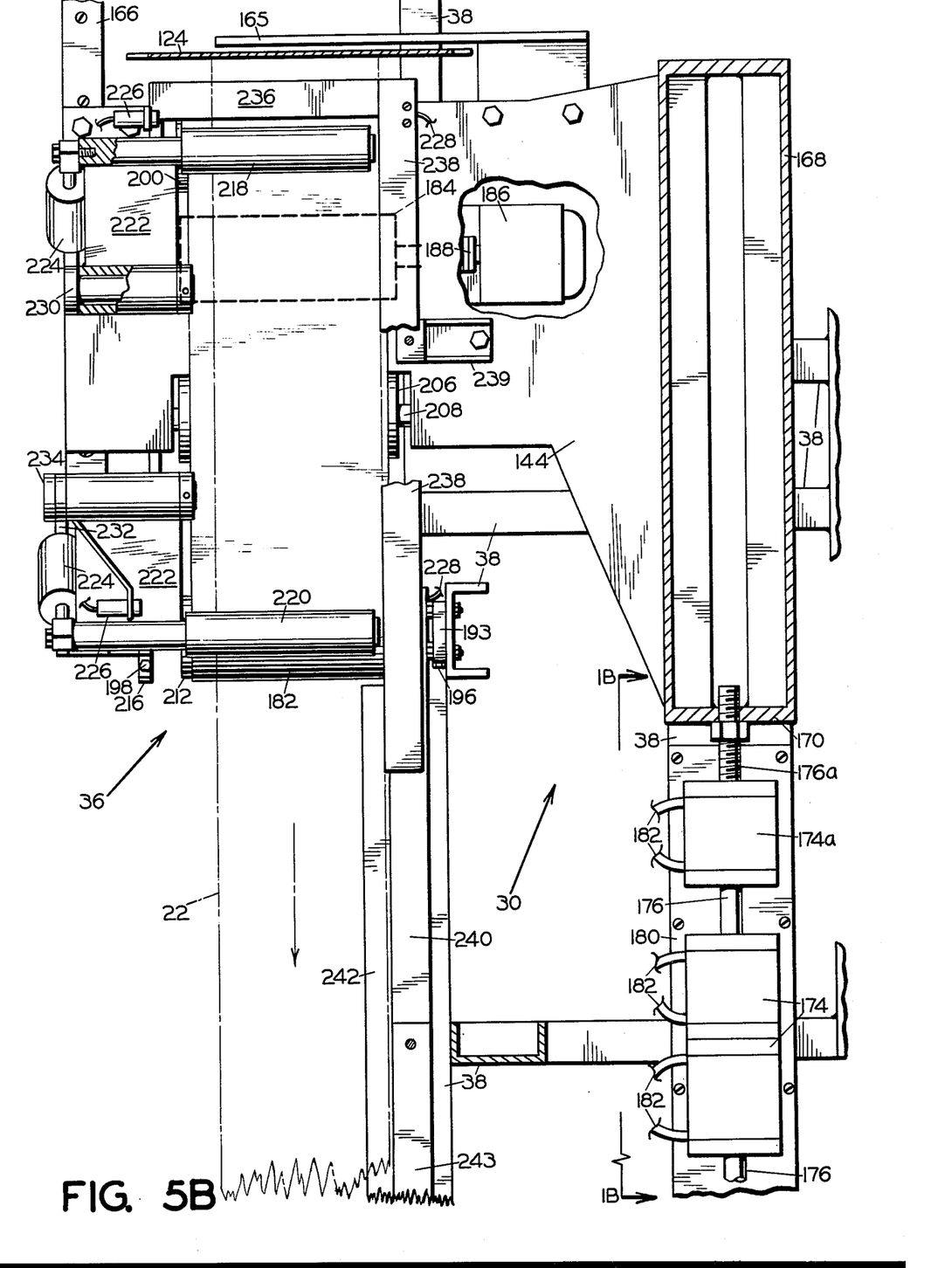

Located above the first sliding roller 200 and second fixed roller 212 are sliding hold-down roller 218 and fixed hold-down roller 220 respectively, FIG. 5B. These rollers are mounted on pivotal arms 222 similarly to the infeed hold-down rollers 50. They also are movable between lowered positions against the top of the piece of lumber and raised positions above the lumber, by means of double-acting fluid operated piston-cylinders 224. Again, electric eyes 226 and opposed light sources 228 are located near each hold-down roller for actuation of the cylinder associated with it.

The sliding hold-down roller 218 is carried by a bracket 230 which is attached to the sliding plate 144. Thus it translates with the first sliding roller 200 with which it mates. The fixed hold-down roller is carried by a bracket 232 and doubler 234 which are attached to the frame 38.

Figures 4, 15, 16:
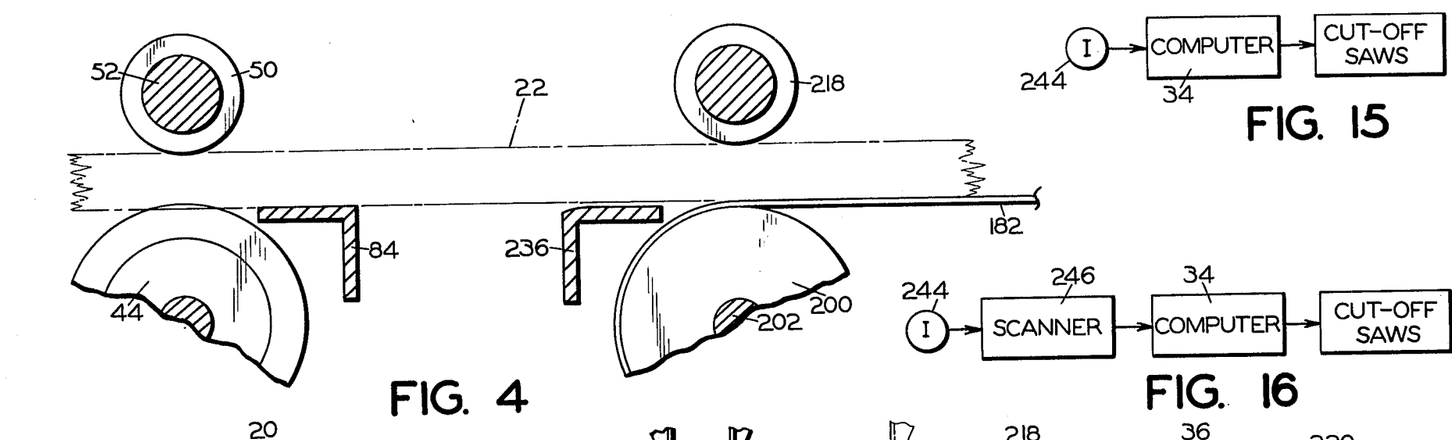
FIG. 4 is a semi-diagrammatic detailed view of a portion of the apparatus shown in FIG. 3.
FIGS. 15 and 16 are diagrammatic views showing the flow of a piece of lumber through the components of the apparatus.

Located at the leading edge of the outfeed means is a bed plate 236, FIG. 4, configured similarly to bed plate 84 of the infeed means, for supporting the piece of lumber between the sliding saw and the first sliding roller 200. Bed plate 236 is tied to the sliding plate 144 for movement therewith. Referring to FIG. 4, bed plate 236 is located slightly below the piece of lumber 22. However it still supports the piece of lumber and clamps it somewhat during sawing. The leading edge of bed plate 236 is relieved preventing interference with the piece of lumber.

A sliding fence 238 is attached at its leading edge to the sliding plate 144 by means of brackets 239 and at its trailing edge to holder 204. It is coplanar with infeed fence 66 for indexing the piece of lumber laterally in the outfeed means.

A fixed fence 240 is mounted to the frame immediately downstream of the outfeed means. It is configured for telescoping alongside the sliding fence when the latter is translated. Thus an essentially continuous fence is provided.

Downstream of the outfeed means, a lumber support 242 and guide 243 respectively support and guide the piece of lumber until it clears the apparatus. The lumber support is arranged to engage only one margin of the piece of lumber causing it to tilt sideways and drop out of the apparatus once it passes the second fixed roller 212.

OPERATION

The apparatus can be operated in either of two different modes. The first, shown diagrammatically in FIG. 15, requires an operator 244 to visually observe a piece of lumber and indicate single and defect cut positions to a computer via a keyboard or other input means. The computer then generates stop and saw set information for transmittal to the saw apparatus at appropriate times.

In the second mode, shown diagrammatically in FIG. 16, an operator 244 observes boards passed in front of him and suitably marks acceptable defects, such as a heel mark, and unacceptable areas of the board, such as split ends, which the scanner 246 would respectively report as a defect or report as acceptable wood. The board then proceeds through the scanner which identifies and locates all defects both natural and those indicated by the operator. It also detects the marks made by the operator for acceptable defects. All of this information is then fed to the computer which calculates the value of wood produced by the various combinations of cuts which might be made to remove the defects and cut to specific product lengths, selects the combination having the highest value or greatest downstream production need if such is not less than a programmable value amount, generates saw instructions to implement these selections, and issues them to the saw at appropriate times.

In either mode the operation of the operative elements of the apparatus is the same and operation is initiated by feeding the piece of lumber into the infeed means, FIG. 1A. As the piece of lumber passes electric eyes 62 it interrupts the beams of light from the light sources 64. The electric eyes operate through a time delay network, (not shown) to activate their associated cylinders 60 at the appropriate time to lower the hold-down rollers 50 on top of the piece of lumber as it passes over the respective lower rollers 44. Thus the piece of lumber is sandwiched between the rollers depressing the rubber coating of the lower rollers to give positive non-slip translation of the board.

As the piece of lumber is translated between the two lower rollers it engages side roller 68, FIG. 5A, forcing the roller outwardly against spring 72 to a position where the roller engages one edge of the piece of lumber and urges its other edge into engagement with the infeed fence 66.

When the leading edge of the piece of lumber passes over counter wheel 74, FIG. 3, the wheel is depressed to the position shown by the solid lines in FIG. 3 where it is in engagement with the bottom surface of the piece of lumber. As the piece of lumber is transported in the apparatus, the wheel is rotated indicating the longitudinal location of the piece of lumber in the apparatus. When the trailing edge of the piece of lumber passes counter wheel 74, the wheel is urged by spring 78 to the position shown by the dashed lines. In this position it engages intermediate roller 80 which is driven by the lower roller 44. Therefore the counter wheel 74 continues to be rotated for locating the trailing edge of the piece of lumber in the apparatus.

Referring again to FIG. 1A, as the piece of lumber is fed past the saws it is engaged by the belt 182 of the outfeed means 36 which works in cooperation with the infeed means to transport the piece of lumber. Roller motor 186 of the outfeed means is driven in series with motors 42 of the infeed means. This, along with the mechanical connection through the piece of lumber, results in little or no speed variation between the various drive elements.

As the piece of lumber passes over the first sliding roller 200 and the second fixed roller 212, hold-down rollers 218 and 220 respectively are activated by electric eyes 226 and their associated time delay circuits to be lowered against the piece of lumber urging it against the belt.

Simultaneously with the transportation of the piece of lumber into the apparatus, the saw positioning means moves the sliding saw to its proper longitudinal position in relation to the fixed saw for removing the defect, making a single end trim or making an intermediate cut. As noted previously, the saw positioning means is moved by command of the computer either as a result of operator or scanner input.

Referring to FIG. 1B, fluid is applied to the appropriate cylinders 174, 174a, 174b of the set works. As the selected cylinder rams 176 retract, all cylinders forwardly of the retracted cylinders are slid rearwardly, to the right in FIGS. 1A and 1B. Thus the box frame 168 and the sliding plate 144 also are moved rearwardly a corresponding distance. Since the sliding saw is joined to the box frame by means of end frames 134, it also is moved rearwardly, FIG. 12.

The end frames are suspended for free sliding translation on longitudinal shaft 92 by means of bushings 132. Therefore, when the longitudinal shaft is rotated by motor 120, the sliding friction between the bushings 132 and the shaft is reduced giving free sliding movement without binding.

As the sliding plate 144 is moved rearwardly, first sliding roller 200 is moved also through holders 204. Likewise, second sliding roller 206 is moved through extensions 210. Since bed plate 236 is attached to sliding plate 144 it also is moved along with the plate.

Thus as the sliding saw is moved rearwardly the leading portions of the outfeed means move along with it giving support to the piece of lumber alongside saw blade 124 at all times. Since the two sliding rollers move together, belt 182 remains in tension to be driven by powered roller 184. As was noted, since the linear speed of the belt is determined by the powered roller 184, which is fixed to frame 38, the belt transports the piece of lumber at the same rate as the input means even when the sliding saw is being moved.

When the sliding saw has been positioned correctly to remove the particular defect, and the piece of lumber is in the correct longitudinal position as measured by the locating means 32, the computer 34 stops the infeed and outfeed means terminating translation of the piece of lumber. Then the saw actuation means are actuated by the computer to cut the piece of lumber at the first and second positions removing the defect, which drops immediately through lugs 164 into chute 167 out of the apparatus. It will be noted that where a single intermediate cut or end cut is to be made it is done with the fixed saw only and the sliding saw does not have to be positioned.

The saw blades 82 and 165, which are driven through saw drive motors 94 and 138 respectively, generally are rotated continuously whenever the apparatus is in operation. Thus when cylinders 114 and 160 are actuated by command of the computer, lowering the saw blades through their cutting positions, the piece of lumber is cut simultaneously on both sides of the defect. Again if a single cut is to be made only the fixed saw is lowered. It will be noted that the piece of lumber is clamped adjacent to each of the saw blades by bed plates 84 and 236.

Referring to FIGS. 2, 10 and 13, first and second knuckle arms 102, 108 and first and second hinge plates 146, 154 are rotated on their respective pins causing saw arms 90 and 130 to be rotated on longitudinal shaft 92 lowering the saws.

It will be noted that the first hinge plate 146 is slidable on shaft 148 which is tied to the saw frame 130. Thus the sliding saw frame 130 is slidable longitudinally and the actuation means 28 is fixed to the frame 38.

After making the cut the saw blades are returned to their raised positions by continued extension of the cylinders 114 and 160 to the ends of their strokes. In the next cut cylinders 114 and 160 are retracted causing a like movement of their saws. The computer then causes the infeed and outfeed means to operate again, translating the piece of lumber. The operation of the apparatus generally is continuous with additional pieces of lumber being fed to the apparatus immediately behind each other. When the next defect or cut point arrives at the saw the operation is repeated.

Having thus described by invention in a preferred embodiment, what I claim is:

1. An apparatus for cutting lumber to variable clear lengths comprising:
   a. infeed means configured for supporting and transporting a piece of lumber longitudinally,
   b. at least one fixed saw located above the downstream and of the infeed means in a manner for cutting a piece of lumber transversely at a first position,
   c. at least one sliding saw located adjacent to the fixed saw and movable longitudinally with respect thereto for cutting the piece of lumber transversely at a second position a spaced distance from the first position,
   d. saw actuation means connected to the fixed and sliding saws and configured for actuating them between cutting positions for cutting a piece of lumber, and clear positions out of contact with the piece of lumber, e. saw positioning means joined to the sliding saw and configured for positioning the sliding saw longitudinally with respect to the fixed saw for spacing the cut at the first position a specified distance from the cut at the second position, and f. outfeed means located adjacent to the sliding saw configured for transporting the cut piece of lumber out of the apparatus, g. said outfeed means connected to the saw positioning means in a manner for following the sliding saw at a close spaced distance while maintaining a lineal transport speed matching the feed rate of the infeed means so that the sliding saw may be positioned simultaneously with transportation of the piece of lumber in the apparatus.

2. The apparatus of claim 1 wherein the outfeed means further includes a bed plate located adjacent to the sliding saw and configured for clamping the piece of lumber in the apparatus during sawing.

3. The apparatus of claim 1 wherein the outfeed means comprises;
  a. an endless belt,
  b. at least one powered roller driving the belt,
  c. at least two fixed, freely rotatable rollers carrying the belt,
  d. at least two sliding freely rotatable rollers carrying the belt,
  e. one of said fixed rollers and one of said sliding rollers oriented in the same horizontal plane in a manner for passing a section of the belt therebetween for transporting the piece of lumber,
  f. said sliding rollers connected to the saw actuation means, simultaneously moving therewith for varying the length of said horizontal section of the belt while maintaining a linear transport speed.

4. The apparatus of claim 4 including locating means located in the infeed means and configured for determining the position of the piece of lumber longitudinally in the apparatus relative to the fixed saw.

5. The apparatus of claim 4 wherein the locating means comprises;
  a. a counter wheel,
  b. counter support means pivotally carrying said counter wheel in the apparatus,
  c. biasing means urging the counter support means toward the piece of lumber in a manner for placing the counter wheel in contact with the piece of lumber so that longitudinal movement of the piece of lumber rotates the counter wheel, and
  d. a counter connected to the counter wheel for measuring the travel of the piece of lumber that is passed over the counter wheel.

6. The apparatus of claim 5 including,
  a. an intermediate roller freely, rotatably mounted within the apparatus and driven by the infeed means,
  b. said intermediate roller arranged in a manner for contacting the counter wheel when the counter wheel is not in contact with a piece of lumber, rotating the counter wheel for locating the trailing portion of the piece of lumber in the apparatus after it has passed the counter wheel.

7. The apparatus of claim 4 further including a computer intertied to the infeed means, the outfeed means, the saw positioning means, and the locating means, and programable for positioning the piece of lumber automatically in the apparatus relative to the fixed saw; and for positioning the sliding saw relative to the fixed saw for cutting a defect out of the board accurately with the minimum removal of clear lumber.

8. An apparatus for cutting lumber to variable clear lengths comprising:
  a. rotary infeed means configured for supporting and transporting a piece of lumber longitudinally,
  b. at least one fixed saw located above the downstream end of the infeed means in a manner for cutting a piece of lumber transversely at a first position,
  c. at least one sliding saw located adjacent to the fixed saw and movable longitudinally with respect thereto for cutting the piece of lumber transversely at a second position a spaced distance from the first position,
  d. saw actuation means connected to the fixed and sliding saws and configured for actuating them between cutting positions for cutting a piece of lumber, and clear positions out of contact with the piece of lumber,
  e. saw positioning means joined to the sliding saw and configured for positioning the sliding saw longitudinally with respect to the fixed saw for spacing the cut at the first position a specified distance from the cut at the second position, and
  f. locating means located in the infeed means and configured for determining the position of the piece of lumber longitudinally in the apparatus relative to the fixed saw, the locating means comprising:
    1. a counter wheel,
    2. counter support means pivotally carrying said counter wheel in the apparatus,
    3. biasing means urging the counter support means toward the piece of lumber in a manner for placing the counter wheel in contact with the piece of lumber so that longitudinal movement of the piece of lumber rotates the counter wheel,
    4. a counter connected to the counter wheel for measuring the travel of the piece of lumber that is passed over the counter wheel, and
    5. an intermediate roller freely, rotatably mounted within the apparatus and driven by the rotary infeed means,
    6. said counter wheel being arranged, when not in contact with a piece of lumber, to be urged by the biasing means into contact with the driven intermediate roller, thereby rotating the counter wheel for locating the trailing portion of the piece of lumber in the apparatus after it has passed the counter wheel.

* * * * *